(12) United States Patent
Savicki, Jr.

(10) Patent No.: US 7,285,721 B1
(45) Date of Patent: Oct. 23, 2007

(54) MODULAR TERMINAL DEVICE

(75) Inventor: Gerald R. Savicki, Jr., Canastota, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

(21) Appl. No.: 11/242,406

(22) Filed: Oct. 3, 2005

Related U.S. Application Data

(63) Continuation of application No. 10/726,128, filed on Dec. 2, 2003, now Pat. No. 6,989,489.

(51) Int. Cl.
*H02G 3/08* (2006.01)

(52) U.S. Cl. .................... 174/50; 174/53; 174/59; 220/3.2; 220/3.3; 200/293

(58) Field of Classification Search .................. 174/50, 174/48, 49, 53, 59, 57, 66, 67, 480, 481; 220/3.2, 3.3, 3.92, 3.8, 3.94, 241, 4.02, 242, 220/4.01; 439/535, 536, 107, 490, 491; 200/293, 200/297, 5 R, 317
See application file for complete search history.

(56) References Cited

U.S. PATENT DOCUMENTS

| | | | | |
|---|---|---|---|---|
| 2,433,917 | A * | 1/1948 | McCartney | 174/50 |
| 3,609,647 | A * | 9/1971 | Castellano | 174/53 |
| 3,707,697 | A | 12/1972 | Izumi | |
| 3,879,101 | A | 4/1975 | McKissic | |
| 4,636,914 | A * | 1/1987 | Belli | 174/53 |
| 4,725,249 | A * | 2/1988 | Blackwood et al. | 439/535 |
| 4,842,551 | A | 6/1989 | Heimann | |
| 5,500,487 | A * | 3/1996 | Leon | 174/53 |
| 6,767,245 | B2 | 7/2004 | King | |
| 6,805,469 | B1 | 10/2004 | Barton | |
| 6,814,611 | B1 * | 11/2004 | Torres | 439/535 |
| 6,870,099 | B1 * | 3/2005 | Schultz et al. | 174/53 |
| 7,118,235 | B2 | 10/2006 | Barton | |

* cited by examiner

*Primary Examiner*—Angel R. Estrada
(74) *Attorney, Agent, or Firm*—Daniel P. Malley; Bond, Schoeneck & King PLLC

(57) ABSTRACT

The present invention includes a modular electrical device for use in an electric circuit. The modular electrical device includes a wall plate defining a first opening, and a housing configured to be disposed within the first opening. The housing is configured to accommodate a frame member selected from the plurality of frame members. Each frame member is configured to accommodate at least one wiring assembly. The modular electrical device further includes an electrical wiring assembly chosen from a plurality of electrical wiring assemblies. Each of the plurality of electrical wiring assemblies has a different functional configuration, and each of the plurality of electrical wiring devices being sized to fit in the selected frame member. The modular electrical device further includes a set of terminal contacts selected from a plurality of sets of terminal contacts. Each set of terminal contacts is matched to accommodate one of the plurality of electrical wiring assemblies.

31 Claims, 2 Drawing Sheets

MODULAR TERMINAL DEVICE

CROSS-REFERENCE TO RELATED APPLICATIONS

This is a continuation of U.S. patent application Ser. No. 10/726,128 filed on Dec. 2, 2003 now U.S. Pat. No. 6,989,489, the content of which is relied upon and incorporated herein by reference in its entirety, and the benefit of priority under 35 U.S.C. § 120 is hereby claimed.

BACKGROUND OF THE INVENTION

1. Field of the Invention

The present invention relates to an electrical wiring device and more particularly to an electrical wiring device suitable for commercial and residential use.

2. Background of the Invention

Typically, wall mounted conventional electrical devices for use in residential or commercial applications such as offices require a wall plate specifically configured for the electrical device. For example, each switch, receptacle, or hallway light typically employs its own wall plate opening. Installation of multiple devices may require multiple gang wall plates and multiple gang wall boxes. This requires that an electrical installer carry an inventory of an assortment of wall plates and wall boxes, thereby incurring unnecessary cost.

Thus, there is a need for a modular electrical device that reduces the need for specialized installation, thereby reducing inventory cost and simplifying the installation process.

SUMMARY OF THE INVENTION

In one embodiment, the present invention includes a modular electrical device for use in an electric circuit. The modular electrical device includes a wall plate defining a first opening, and a housing configured to be disposed within the first opening. The housing is configured to accommodate a frame member selected from a plurality of frame members. Each frame member is configured to accommodate at least one wiring module. The modular electrical device further includes an electrical wiring module chosen from a plurality of electrical wiring modules. Each of the plurality of electrical wiring modules has a different functional configuration, and each of the plurality of electrical wiring devices being sized to fit in the selected frame member. The modular electrical device further includes a set of terminal contacts selected from a plurality of sets of terminal contacts. Each set of terminal contacts is matched to accommodate one of the plurality of electrical wiring modules.

DETAILED DESCRIPTION OF THE INVENTION

Figure 1:
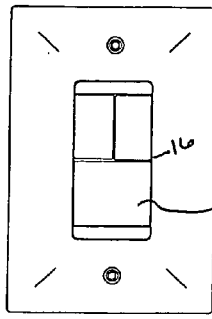
FIG. 1 is front elevation view of the modular electrical device of the present invention.

Reference will now be made in detail to the present embodiments of the invention, examples of which are illustrated in the accompanying drawings. Whenever possible, the same reference numerals will be used throughout the drawings to refer to the same or like parts.

One embodiment of the electrical device of the present invention is shown in FIG. 1 and is designated generally throughout by the reference numeral 10. The electrical device 10 includes a wall plate 12 and an electrical wiring device 14.

The wall plate includes a single rectangular 16 opening configured to receive any one electrical wiring device 14 from a plurality of differently configured electrical wiring devices. In an alternative embodiment, the opening 16 in the wall plate 12 is sized to accommodate a plurality of electrical wiring devices 14 installed in a single wall box in an abutting relationship to one another.

Each of the electrical wiring devices 14 includes a ground strap 15. The ground strap 15 is made from an electrically conductive metal and is configured for mounting the electrical device 10 into a conventional wall box (not shown). The strap 15 is further configured to receive the housing 17 of the electrical wiring device 14. The housing 17 includes a body 19, and a frame 21 that work in cooperation to provide mounting places for the components of the electrical device 10, such as terminals and electrical switch components.

It will be readily apparent to those of ordinary skill in the art that, in view of the teachings disclosed herein, modifications to the described embodiment may be made to incorporate a variety of electrical wiring devices without departing from the scope of the present disclosure. Both the body 19 and frame 21 are made from a non-electrically conductive material, such as, for example plastic and may be made for example, by a molding process, such as, for example an injection molding process.

The body 19 is configured to receive a plurality of terminals 23. The terminals 23 fit into openings in the sides of the body 19. The openings are configured to securely hold the terminals 23 in predetermined positions that electrically isolate the terminals 23 from one another. Each of the terminals 23 is configured for the coupling of an electrically conductive wire thereto.

Figure 10:
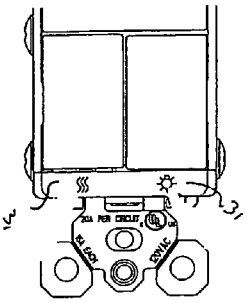
FIG. 10 is an enlarged fragmentary view of an electrical wiring device of the present invention showing a blank marked with identifying symbols.
Figure 2:
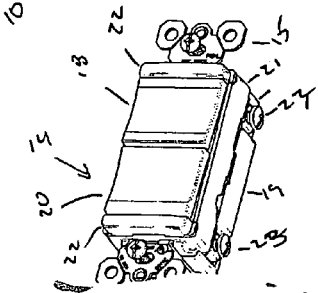
FIG. 2 a perspective view of an one embodiment of an electrical wiring device used in the modular electrical device of the present invention.

Turning to FIG. 2, one possible electrical wiring device 14 for use in the modular electrical device 10 of the present invention is shown. The electrical wiring device 14 includes two switches 18,20 and two modular blanks 22. The two switches 18, 20 may be either single pole or three-way switches. Thus, the electrical wiring device 14 may include two single pole switches, two three-way switches or a single pole and a three-way switch. The blanks 22 are removably engageable members that aid in alignment of the electrical wiring device 14 within the opening 16 of the wall plate 12 of the modular electrical device 10. FIG. 10 shows a detail of the installation of a single blank 22. As shown in FIG. 10, the blank 22 may include identifying symbols 31. In an alternative embodiment the blanks 22 do not include any identifying markings.

Figure 3:
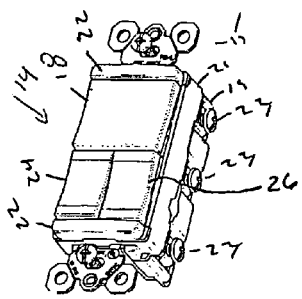
FIG. 3 a perspective view of an alternative embodiment of an electrical wiring device used in the modular electrical device of the present invention.

Turning to FIG. 3, another possible electrical wiring device 14 for use in the modular electrical device 10 of the present invention is shown. The electrical wiring device 14 shown in FIG. 3 includes three switches 18, 24, 26 and two blanks 22. The switches 18, 24, 26 may be either single pole or three-way switches. Thus, the electrical wiring device may be configured to include three single pole switches, two single pole switches and one three-way switch, one single pole switch and two three-way switches or three three-way switches. The blanks 22 are removably engageable members that aid in alignment of the electrical wiring device 14 within the opening 14 of the wall plate 12 of the modular electrical device 10.

Figure 4:
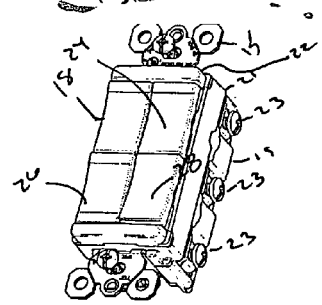
FIG. 4 a perspective view of an alternative embodiment of an electrical wiring device used in the modular electrical device of the present invention.

Turning to FIG. 4, another possible electrical wiring device 14 for use in the modular electrical device 10 of the present invention is shown. The electrical wiring device 14 shown in FIG. 4 includes four switches 18,24,26,28 and two blanks 22. The four switches 18, 24, 26, 28 may be either single pole or three-way switches. Thus, the electrical wiring device may be configured to include four single pole switches, three single pole switches and one three-way switch, two single pole switch and two three-way switches, one single pole and three three-way switches or four three-way switches. The blanks 22 are removably engageable members that aid in alignment of the electrical wiring device 14 within the opening 16 of the wall plate 12 of the modular electrical device 10.

Figure 5:
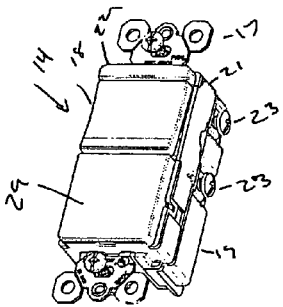
FIG. 5 a perspective view of an alternative embodiment of an electrical wiring device used in the modular electrical device of the present invention.

Turning to FIG. 5, another possible electrical wiring device 14 for use in the modular electrical device 10 of the present invention is shown. The electrical wiring device 14 includes a switch 18, a placard holder 29 and a single blank 22. This electrical wiring device is similar to ones described in co-pending U.S. patent application Ser. No. 10/726,137 entitled Electrical Switch with Placard and Remote Use Indicator, which is hereby incorporated by reference in its entirety. The switch 18 may be either a single pole or a three-way switch. The placard holder is configured to display a removable media that may include text, tactile indicia, images or a combination thereof. The single blank 22 is used to align the electrical device 14 within the opening 16 of the wall plate 12.

Figure 6:
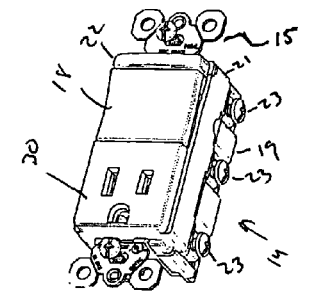
FIG. 6 a perspective view of an alternative embodiment of an electrical wiring device used in the modular electrical device of the present invention.

Turning to FIG. 6, another possible electrical wiring device 14 for use in the modular electrical device 10 of the present invention is shown. The embodiment of the electrical wiring device 14 shown in FIG. 6 includes a switch 18, a receptacle 30 and a single blank 22. The switch 18 may be either a single pole or a three-way switch. The receptacle may be configured to include ground fault interruption protection. The single blank 22 is used to align the electrical device 14 within the opening 16 of the wall plate 12.

Figure 7:
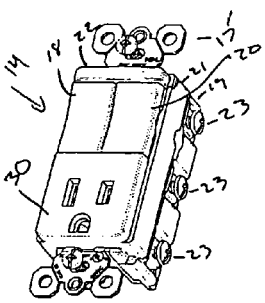
FIG. 7 a perspective view of an alternative embodiment of an electrical wiring device used in the modular electrical device of the present invention.

Turning to FIG. 7, another possible electrical wiring device 14 for use in the modular electrical device 10 of the present invention is shown. The embodiment of the electrical wiring device 14 shown in FIG. 7 includes two switches 18, 20 mounted in a side-by-side configuration, a receptacle 30 and a single blank 22. The two switches 18, 20 may be either single pole or three-way switches. Thus, the electrical wiring device 14 shown in FIG. 7 may be configured to include two single pole switches, a single pole switch and a three-way switch or two three-way switches. The receptacle may be configured to include a ground fault circuit interruption (GFCI) protection. The single blank 22 is used to align the electrical device 14 within the opening 16 of the wall plate.

Figure 8:
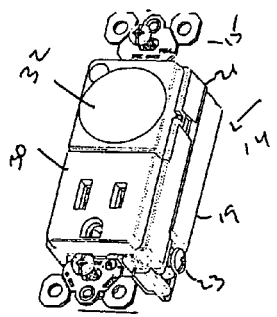
FIG. 8 a perspective view of an alternative embodiment of an electrical wiring device used in the modular electrical device of the present invention.
Figure 9:
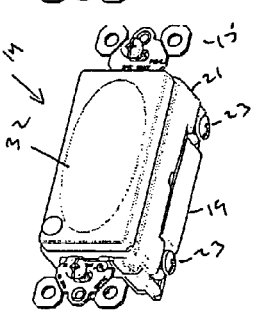
FIG. 9 a perspective view of an alternative embodiment of an electrical wiring device used in the modular electrical device of the present invention.

Turning to FIG. 8, another possible electrical wiring device 14 for use in the modular electrical device 10 of the present invention is shown. The embodiment of the electrical wiring device shown in FIG. 8 includes a hallway light 32 and a receptacle 30. The hallway light 32 is configured to provide a predetermined quantity of illumination when electrical power is supplied. The receptacle may be configured to include ground fault circuit interruption (GFCI) or arc fault circuit interrupter (AFCI) protection. [0019] Turning to FIG. 9, another possible electrical wiring device 14 for use in the modular electrical terminal 10 of the present invention is shown. The embodiment of the electrical wiring device 14 shown in FIG. 9 includes a hallway light that is sized to substantially fill the opening 16 of the wall plate 12. The hallway light 32 is configured to provide a predetermined quantity of illumination when electrical power is supplied.

Figure 12:
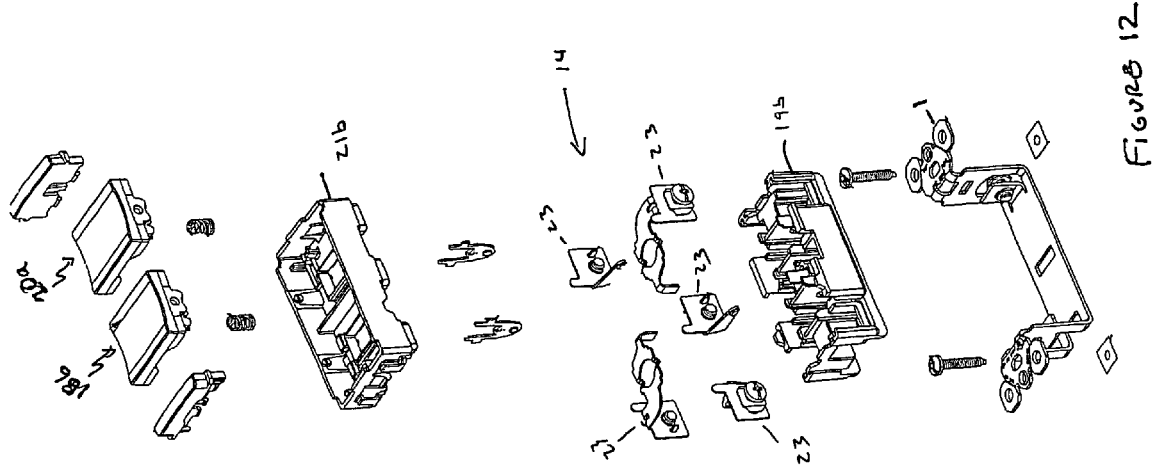
FIG. 12 is an exploded view of the electrical wiring device 14 shown in FIG. 2 in accordance with another embodiment of the invention.
Figure 11:
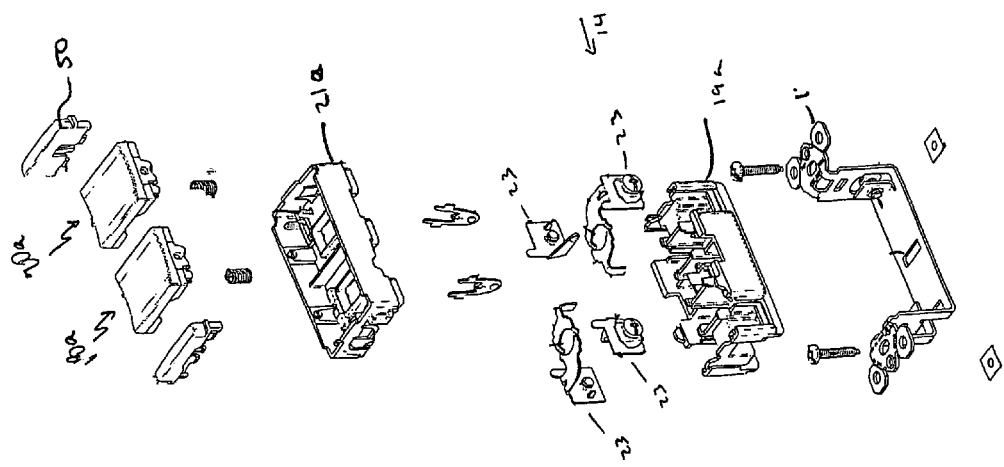
FIG. 11 is an exploded view of the electrical wiring device 14 shown in FIG. 2 in accordance with an embodiment of the invention.

FIG. 11 is an exploded view of the electrical wiring device 14 shown in FIG. 2 in which the two switches 18*a*, 20*b* are both single pole switches. FIG. 12 is an exploded view of the electrical device 14 shown in FIG. 2 in which one switch 18*b* is configured as a single pole switch and the other switch 20*b* is configures as a three-way switch. Both of these embodiments are more fully described in co-filed U.S. patent application Ser. No. 10/729,566, entitled Modular Electrical Device with Circuit Splitting Member, filed on Dec. 4, 2003, which is herein incorporated by reference in its entirety.

Comparing the body 19*a* of FIG. 11 with the body 19*b* of FIG. 12 it is evident that body 19*a* is configured to receive four terminals 23 and body 19*b* is configured to receive five terminals 23. Both body 19*a* and body 19*b* are configured to engage the ground strap 15 in an identical manner. Both body 19*a* and body 19*b* are examples of the different types of frames that may be selected to provide an electrical wiring device 14 with a desired functionality. Both body 19*a* and body 19*b* exhibit the common trait to all of the bodies used in the present invention, namely that they posses a substantially common form factor that allows a them and a complementary frame 21 to engage a specific sized opening in a wall plate 12. The complimentary frame 21 is also selected depending upon the desired functionality of the electrical wiring device 14.

FIGS. 11 and 12 illustrate a removable lamp module 50 having a form factor configured to replace blank 22. Lamp module 50 is configured to take the place of blank 22 in the various embodiments of the invention. Lamp module 50 is electrically coupled to at least two terminals 23. Lamp module 50 can operate as a remote use indicator, emitting light when a switch provides power to the load. Alternatively, lamp module 50 can operate as a locator for modular electrical device 10, emitting light when a switch in wiring device 14 is not providing power to a load. A locator can have several benefits, for example, assisting with the location of the electrical device in a darkened room. Alternatively, lamp module 50 can operate as a power indicator (or live indicator) for modular electrical device 10, emitting light when electrical power is coupled to modular electrical device 10. Lamp module 50 includes a circuit that results in a steady light emission or, alternatively, that results in a blinking light emission, occurring during an intended circumstance for light emission such as has been described. The removable lamp indicator is similar to ones described in co-pending U.S. patent application Ser. No. 10/726,173 entitled Electrical Device number with Lamp Module, recorded herein by way of reference in its entirety.

Whereas the switch in the various embodiments have been characterized as single pole or three way switches, a switch can be in any number of configurations, for example, two single pole switches.

Thus, different combinations of frame 21 and body 19 pairs may be assembled to form an almost limitless array of electrical wiring devices to provide a desired functionality.

As will be readily appreciated by those skilled in the mi, the choice of functionality of the electrical wiring device 14 determines which frame 21 and body 19 are selected. The overriding consideration is that no matter which frame 21 and body 19 are chosen, that when they are combined to form a housing the 17, the housing exhibits a consistent form factor allowing the housing to be engage the wall plate 12 regardless of the functional design of the electrical wiring device 14.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

I claim:

1. A modular electrical device for use in an electric circuit, the device comprising:
    an electrical load control assembly selected from a plurality of electrical load control assemblies, each of the plurality of electrical load control assemblies including at least one electrical load control mechanism, each electrical load control mechanism including a user-accessible portion and a control interface;
    a housing configured to accommodate each of the plurality of electrical load control assemblies, each of the plurality of electrical load control assemblies being sized to fit in the housing such that the control interface of the selected electrical load control assembly engages selected contacts disposed in the housing in accordance with the user-accessible portion; and
    whereby each housing and electrical load control assembly combination is characterized by a substantially common rectangular form factor.

2. The device of claim 1, wherein the control interface is configured to actuate the electrical load control device via the user-accessible portion.

3. The device of claim 1, wherein the control interface includes at least one switch interface mechanism configured to selectively engage a corresponding set of contacts.

4. The device of claim 3, wherein the user-accessible portion includes a button that has two tactile surfaces configured to allow selective engagement or disengagement of the contacts, wherein the tactile surfaces are disposed along a line that is parallel to the major axis of the housing.

5. The device of claim 1, wherein the housing is substantially disposed within a wall box and the electrical load control assembly is framed within a wall plate defining a first opening such that only the user-accessible portion is visible to a user after installation of the modular device.

6. The device of claim 1, wherein said electrical load control assembly includes a first switch and a second switch.

7. The device of claim 6, wherein at least one of said first switch and said second switch is a single pole switch.

8. The device of claim 6, wherein at least one of said first switch and said second switch is a three way switch.

9. The device of claim 6, wherein said electrical load control assembly further includes a third switch.

10. The device of claim 9, wherein at least one of said first switch, said second switch and said third switch is a single pole switch.

11. The device of claim 9, wherein at least one of said first switch said second switch and said third switch is a three-way switch.

12. The device of claim 9, wherein said electrical load control assembly further includes a fourth switch.

13. The device of claim 12, wherein at least one of said first switch, said second switch, said third switch and said fourth switch is a single pole switch.

14. The device of claim 12, wherein at least one of said first switch said second switch, said third switch and said fourth switch is a three-way switch.

15. The device of claim 1, wherein said electrical load control assembly further includes a receptacle.

16. The device of claim 15, wherein said receptacle includes at least one of ground fault circuit interrupt or arc fault circuit interrupt.

17. The device of claim 15, wherein said electrical load control assembly includes a first switch.

18. The device of claim 17, wherein said first switch is a single pole switch.

19. The device of claim 17, wherein said first switch is a three-way switch.

20. The device of claim 1, wherein said electrical load control assembly includes a night light.

21. The device of claim 1, further comprising a lamp assembly, the lamp assembly being configured to be disposed in the housing.

22. The device of claim 21, wherein the lamp assembly includes a remote use indicator.

23. The device of claim 21, wherein the lamp assembly includes a locator for indicating the location of the modular electrical device.

24. The device of claim 21, wherein the lamp assembly indicates the coupling of electrical power to the modular electrical device.

25. The device of claim 1, wherein the housing includes a placard holder.

26. The device of claim 1, wherein the housing includes an opening configured to accommodate an interchangeable assembly.

27. The device of claim 26, wherein the interchangeable assembly is a blank.

28. The device of claim 26, wherein the interchangeable assembly is a lamp assembly.

29. A method for installing a modular electrical device in an electric circuit, the method comprising:
    providing a plurality of electrical load control assemblies, each of the plurality of electrical load control assemblies including at least one electrical load control mechanism, each electrical load control mechanism including a user-accessible portion and a control interface; and providing a housing configured to accommodate each of the plurality of electrical load control assemblies, each of the plurality of electrical load control assemblies being sized to fit in the housing such that the control interface of the selected electrical load control assembly engages selected contacts disposed in the housing in accordance with the user-accessible portion, whereby each housing and electrical load control assembly combination is characterized by a substantially common rectangular form factor.

30. The method of claim 29, further comprising:
selecting an electrical load control assembly from the plurality of electrical load control assemblies; and
inserting the selected electrical load control assembly into the housing.

31. The method of claim 29, further comprising the step of installing the modular electrical device such that the housing is substantially disposed within a wall box and the electrical load control assembly is framed within a wall plate defining a first opening such that only the user-accessible portion is visible to a user.

* * * * *